US012686414B2

(12) United States Patent
Matsui et al.

(10) Patent No.: US 12,686,414 B2
(45) Date of Patent: Jul. 21, 2026

(54) VEHICLE CONTROL DEVICE PERFORMING HARDWARE PROTECTION CONTROL

(71) Applicant: TOYOTA JIDOSHA KABUSHIKI KAISHA, Toyota (JP)

(72) Inventors: Masayuki Matsui, Ichinomiya (JP); Keigo Matsubara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/762,957

(22) Filed: Jul. 3, 2024

(65) Prior Publication Data

US 2025/0065923 A1     Feb. 27, 2025

(30) Foreign Application Priority Data

Aug. 21, 2023     (JP) ................................. 2023-133752

(51) Int. Cl.
B60W 60/00 (2020.01)
B60W 50/00 (2006.01)

(52) U.S. Cl.
CPC ...... B60W 60/005 (2020.02); B60W 50/0098 (2013.01)

(58) Field of Classification Search
None
See application file for complete search history.

(56) References Cited

U.S. PATENT DOCUMENTS

| | | | |
|---|---|---|---|
| 2017/0259804 A1* | 9/2017 | Lee ........................ | B60K 6/547 |
| 2019/0308603 A1 | 10/2019 | Matsumura | |
| 2020/0391790 A1* | 12/2020 | Kamemura ............ | B62D 5/006 |
| 2021/0163000 A1* | 6/2021 | Dieckmann ........... | G01S 13/931 |
| 2022/0048538 A1* | 2/2022 | Zaydel .............. | B60W 60/0025 |
| 2022/0389881 A1* | 12/2022 | Ottikkutti ........... | F02D 41/1498 |

FOREIGN PATENT DOCUMENTS

| | | |
|---|---|---|
| JP | 2011-214408 A | 10/2011 |
| JP | 2019-187100 A | 10/2019 |
| JP | 2020-019456 A | 2/2020 |

* cited by examiner

*Primary Examiner* — James J Lee
*Assistant Examiner* — David Hatch
(74) *Attorney, Agent, or Firm* — SoraIP, Inc.

(57) ABSTRACT

When the driving mode is the automatic driving mode, the vehicle control device executes the first hard protection control according to the component-related parameter representing the state or the operating environment of the in-vehicle component, and when the driving mode is the manual driving mode, the vehicle control device executes the second hard protection control having a higher protection performance of the in-vehicle component than the first hard protection control according to the component-related parameter.

3 Claims, 3 Drawing Sheets

FIG. 2

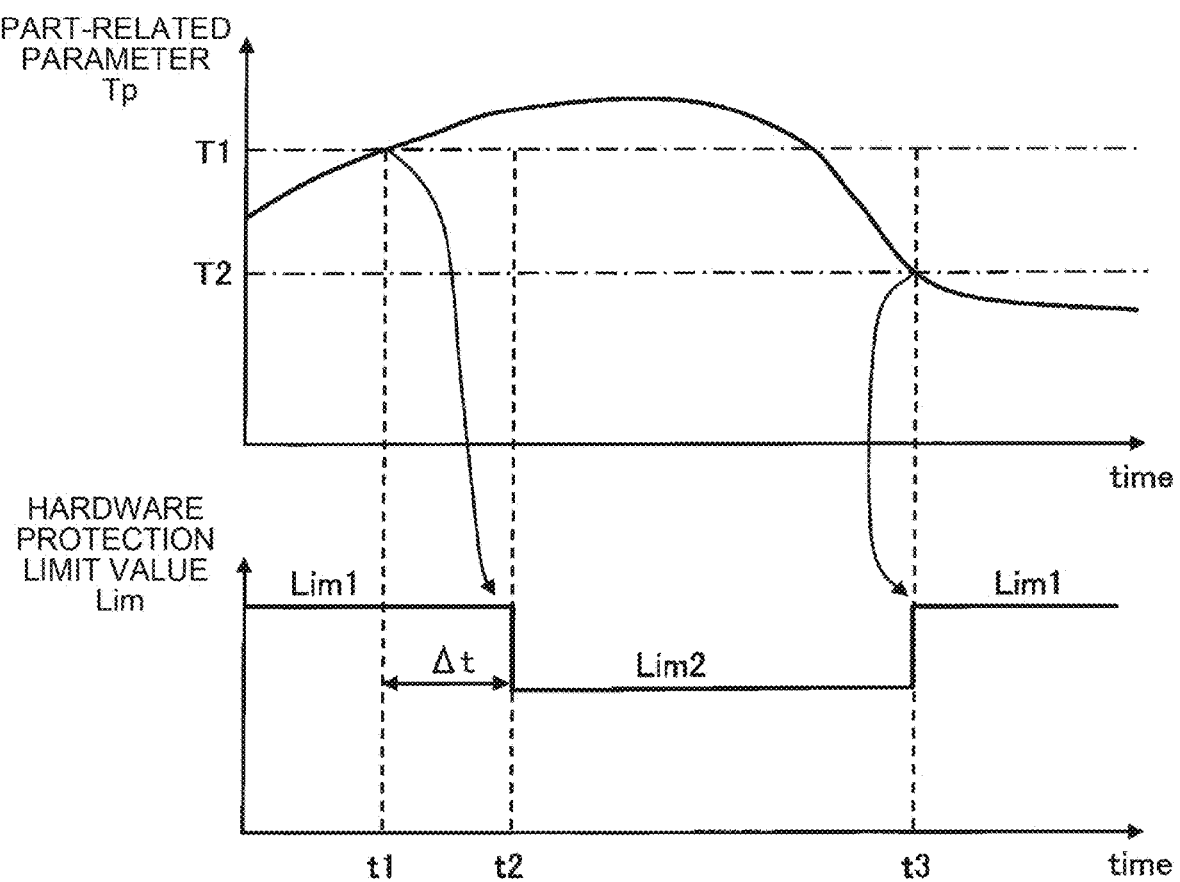

FIG. 3

| AUTOMOTIVE PARTS | PART-RELATED PARAMETER Tp | HARDWARE PROTECTION LIMIT VALUE Lim |
|---|---|---|
| ENGINE 10 | INTAKE AIR TEMPERATURE Ta OR OUTSIDE AIR TEMPERATURE | ENGINE POWER |
| ENGINE 10 | COOLANT TEMPERATURE Tw | ENGINE POWER |
| CLUTCH 33 | CLUTCH-TEMPERATURE Tc | TORQUE |
| AUTOMATIC TRANSMISSION 34 | OIL TEMPERATURE To | TORQUE |
| ELECTRIC MOTOR 32 | MOTOR TEMP. Tm | MOTOR OUTPUT |
| BATTERY 21 | BATTERY TEMP. Tb | BATTERY OUTPUT |

VEHICLE CONTROL DEVICE PERFORMING HARDWARE PROTECTION CONTROL

CROSS-REFERENCE TO RELATED APPLICATION

This application claims priority to Japanese Patent Application No. 2023-133752 filed on Aug. 21, 2023, incorporated herein by reference in its entirety.

BACKGROUND

1. Technical Field

The present disclosure relates to a vehicle control device used for a vehicle having an autonomous driving mode and a manual driving mode.

2. Description of Related Art

Conventionally, there has been proposed a technique of protecting an on-board component by controlling output torque to be limited, when an oil temperature of a transmission of a vehicle is high (for example, Japanese Unexamined Patent Application Publication No. 2011-214408 (JP 2011-214408 A)).

SUMMARY

However, the inventors of the present disclosure have found that the need for component protection changes depending on whether the vehicle is traveling in a manual driving mode or the vehicle is traveling in an autonomous driving mode. Therefore, it is desired to provide component protection suitable for the driving mode.

In a vehicle control device used for a vehicle including, as a driving mode, an autonomous driving mode and a manual driving mode according to an aspect of the present disclosure, when the driving mode is the autonomous driving mode, first hardware protection control is executed in accordance with a component-related parameter representing a state or an operating environment of an on-board component, and when the driving mode is the manual driving mode, second hardware protection control with higher protection performance for the on-board component than the first hardware protection control is executed in accordance with the component-related parameter. With the vehicle control device, in the manual driving mode, the protection performance for the on-board component can be increased more than in the autonomous driving mode, and in the autonomous driving mode, travel performance of the vehicle can be increased more than in the manual driving mode.

In the vehicle control device according to the above aspect, the autonomous driving mode may include a manned autonomous driving mode and an unmanned autonomous driving mode, and the vehicle control device may be configured such that, in the first hardware protection control, the protection performance for the on-board component is higher in the manned autonomous driving mode than in the unmanned autonomous driving mode.

With the vehicle control device, in the manned autonomous driving mode, the protection performance for the on-board component can be increased more than in the unmanned autonomous driving mode, and in the unmanned autonomous driving mode, the travel performance of the vehicle can be increased more than in the manned autonomous driving mode.

In the vehicle control device according to the above aspect, the vehicle control device may be able to execute the autonomous driving mode in a plurality of autonomous driving levels, and the vehicle control device may be configured such that, when an autonomous driving level is at a first level, the protection performance for the on-board component is increased more than when the autonomous driving level is at a second level that is higher than the first level.

With the vehicle control device, the protection performance for the on-board component can be increased when the autonomous driving level is low, and the travel performance of the vehicle can be increased when the autonomous driving level is high.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a timing chart showing an operation example of the hard protection control;

FIG. 3 is an explanatory diagram illustrating an in-vehicle component, a component-related parameter, and a hardware protection limit value to be subjected to hard protection control.

DETAILED DESCRIPTION OF EMBODIMENTS

Figure 1:
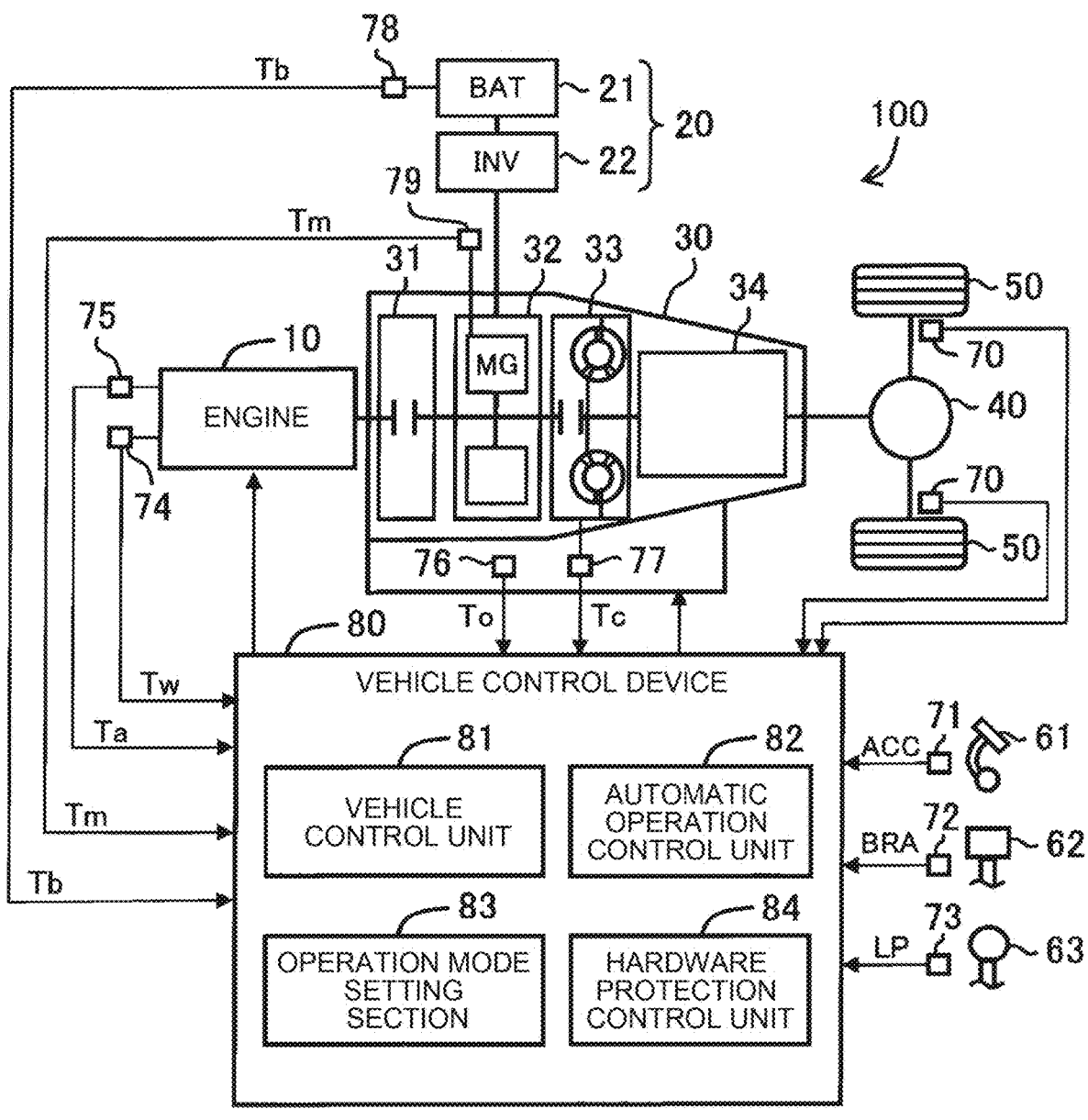
FIG. 1 is an explanatory view showing a configuration of a power transmission system of a vehicle.

FIG. 1 is an explanatory diagram illustrating a configuration of a power transmission system of a vehicle 100. The vehicle 100 has an automatic driving mode and a manual driving mode as driving modes. The vehicle 100 includes an engine 10 that is an internal combustion engine, a motor drive unit 20, a transmission 30, a differential device 40, a plurality of drive wheels 50, and a vehicle control device 80.

The transmission 30 includes a first clutch 31, an electric motor 32, a lock-up clutch 33, and an automatic transmission 34. The first clutch 31 has a function of disconnecting the connection between the engine 10 and the electric motor 32. The electric motor 32 is driven by the motor drive unit 20 as necessary to assist the driving force of the vehicle 100. In addition, the electric motor 32 can Electric Vehicle (EV) travel while the engine 10 is completely disconnected by the first clutch 31. The motor drive unit 20 includes a battery 21 and an inverter 22. The electric motor 32 can also perform a regenerative operation. The regenerative power generated by the inverter 22 is charged to the battery 21.

The lock-up clutch 33 can maintain the connection state between the engine 10 and the automatic transmission 34 in the slip state. In the slip control of the lock-up clutch 33, the engagement force can be adjusted by an external force such as hydraulic pressure. An output shaft of the automatic transmission 34 is connected to the differential device 40. Note that the configuration of the transmission 30 illustrated in FIG. 1 is an example, and may have other configurations.

Each of the drive wheels 50 is provided with a wheel speed sensor 70. The accelerator pedal 61 is provided with an accelerator operation amount sensor 71 that measures an accelerator operation amount ACC. The brake pedal 62 is provided with a brake pedal sensor 72 that measures the depression amount BRA of the brake pedal 62. The shift lever 63 is provided with a shift position sensor 73 that measures the shift position LP. The engine 10 is provided with a water temperature sensor 74 for measuring the coolant temperature Tw and an intake air temperature sensor 75 for measuring the intake air temperature Ta. The transmission 30 is provided with an oil temperature sensor 76 for measuring the oil temperature To of the hydraulic circuit and a clutch temperature sensor 77 for measuring the clutch temperature Tc of the lock-up clutch 33. The battery 21 is provided with a battery temperature sensor 78 that measures a battery temperature Tb. The electric motor 32 is provided with a motor temperature sensor 79 that measures the motor temperature Tm. The measurement values measured by the various sensors 70 to 79 are input to the vehicle control device 80.

The vehicle control device 80 includes a vehicle control unit 81, an autonomous driving control unit 82, a driving mode setting unit 83, and a hardware protection control unit 84. The vehicle control device 80 may be configured using one or more Electronic Control Unit (ECU). ECU includes a processor, a RAM, and a ROM, and a computer program is stored in ROM. The functions of the units 81 to 84 can be realized by the processor executing a computer program stored in a non-volatile storage medium. Part of the functions of these units 81 to 84 may be realized by a hardware circuit.

The vehicle control unit 81 performs various types of control such as drive control, brake control, and steering angle control for driving the vehicle 100. The vehicle control unit 81 is used in both the automatic driving and the manual driving.

The autonomous driving control unit 82 executes autonomous driving of the vehicle 100. Specifically, the autonomous driving control unit 82 transmits, to the vehicle control unit 81, a driving force command value indicating the driving force of the driving unit (engine or motor), a brake command value indicating the operating state of the brake mechanism, and a steering angle command value indicating the steering angle of the wheels. The vehicle control unit 81 executes control of each control target mechanism in accordance with a given command value.

In the present disclosure, "automatic operation" means an operation in which at least a part of the drive control, the brake control, and the steering angle control is automatically executed. That is, the term "autonomous driving" includes autonomous driving from level 1 to level 5. The level 1 and level 2 autonomous driving are referred to as "manned autonomous driving" because monitoring by a driver is required. The manned automatic driving includes driving using an adaptive cruise control or a lane keep assist system. The autonomous driving at level 3, level 4, and level 5 is called "unmanned autonomous driving" because monitoring by a driver is unnecessary. In the unmanned automatic driving, the operating state of the drive unit, the operating state of the brake mechanism, and the steering angle of the wheels are automatically determined. "Manual operation" means an operation performed by a driver to operate an accelerator pedal for controlling a driving unit, an operation of a brake bell for controlling a brake, and an operation of a steering wheel for controlling a steering angle.

The driving mode setting unit 83 switches the driving mode of the vehicle 100 to either the manual driving mode or the automatic driving mode. In the autonomous driving mode, which level of autonomous driving is performed is also set. The operation mode can be switched, for example, by the occupant selecting an option displayed on the display. Further, switching of the operation mode may be received from an external device via wireless communication.

The hardware protection control unit 84 executes hard protection control of the in-vehicle component. The hard protection control is a control performed for protecting an in-vehicle component, and may be referred to as a "component protection control". In the present embodiment, in particular, protection control of components of the power transmission system is performed.

FIG. 2 is a timing chart illustrating an operation example of the hard protection control. FIG. 2 illustrates an exemplary change in the component-related parameter Tp and the hardware protection limit value Lim. The component-related parameter Tp is a parameter indicating a condition or an operating environment of the in-vehicle component to be protected. A typical example of the component-related parameter Tp is the temperature of the in-vehicle component. The hardware protection limit value Lim is a property value limited for hard protection, and is, for example, power or torque.

In the component-related parameter Tp, a first threshold T1 for determining the start timing of hard protection and a second threshold T2 for determining the end timing of hard protection are set. The second threshold T2 is set to be smaller than the first threshold T1.

In the hardware protection limit value Lim, a normal limit value Lim1 when the hard protection control is not executed and a protection enhancement limit value Lim2 when the hard protection control is executed are set. The protection-enhancement limit value Lim2 is set to a value lower than the normal limit value Lim1.

Prior to the time t1, since the component-related parameter Tp is less than the first threshold T1, the normal limit Lim1 is applied. In the time t1, when the component-related parameter Tp becomes equal to or larger than the first threshold T1, the hard protection control is started at the time t2 after the preset delay time Δt, and the protection enhancement limit value Lim2 is applied as the hardware protection limit value. However, when the component-related parameter Tp becomes equal to or less than the second threshold T2 during the delay time Δt, the hard-protection control is not started, and the normal limit Lim1 is maintained.

In the period from the time t2 to the time t3, since the component-related parameter Tp is maintained at the second threshold T2 or higher, the protection-enhancement limit Lim2 is applied. After the time t3, since the component-related parameter Tp is less than the second threshold T2, the hard-protection control is terminated and the normal limit Lim1 is applied. According to such a hard protection control, it is possible to prevent a failure or the like from occurring in the in-vehicle component.

FIG. 3 is an explanatory diagram illustrating exemplary in-vehicle components, component-related parameter Tp, and hardware protection limit values to be subjected to hard protection control. For example, the engine 10, the clutch 33, the automatic transmission 34, the electric motor 32, the battery 21, and the like are used as the in-vehicle components to be subjected to the hard protection control. As the component-related parameter Tp of the engine 10, it is considered that an intake air temperature Ta or an outside air temperature is used or a coolant temperature Tw is used. The intake air temperature Ta or the outside air temperature is a parameter indicating the operating environment of the engine 10. The coolant temperature Tw is a parameter indicating the condition of the engine 10. In FIG. 3, the component-related parameter Tp of the in-vehicle components other than the engine 10 is a parameter indicating the status of the in-vehicle components. The hardware protection limit value is the output of the engine 10, the electric motor 32, and the battery 21, and the torque of the clutch 33 and the automatic transmission 34. Note that the hard protection control may be applied to only some of these in-vehicle components. Other in-vehicle components may be subject to hard protection control.

Figure 4:
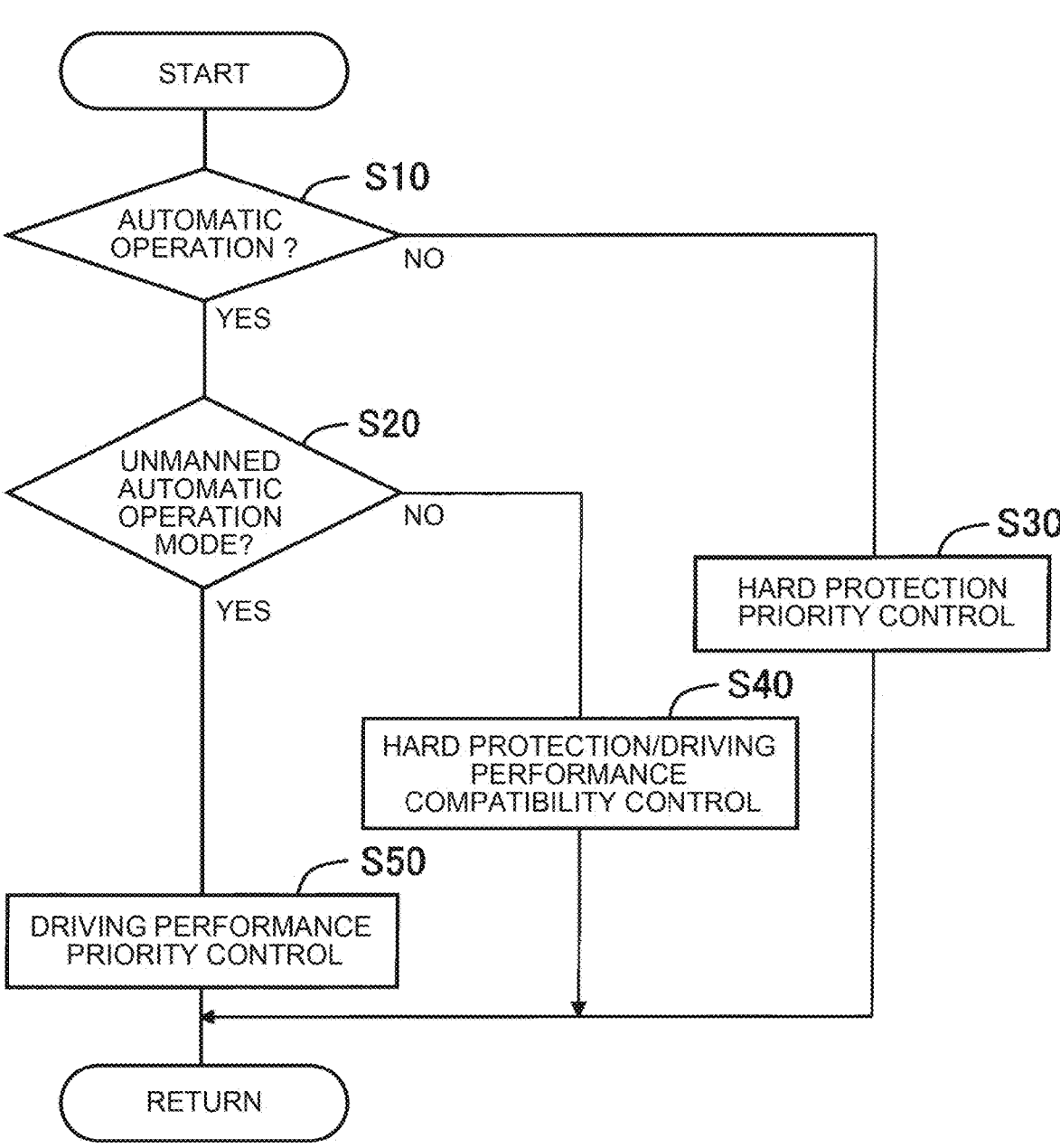
FIG. 4 is a flowchart illustrating a processing procedure of the hard protection control according to the embodiment.

FIG. 4 is a flowchart illustrating a processing procedure of the hard protection control according to the embodiment. The process of FIG. 4 is preferably performed periodically at regular intervals. In the present embodiment, the following three types of hard protection control are used.

Hard protection priority control: Among the three types of hard protection control, the control with the highest hard protection performance and the lowest running performance. Hard protection/driving performance compatibility control: Among the three types of hard protection, control in which the hard protection performance and the driving performance are respectively intermediate performance.

Driving Performance Priority Control: Among the three types of hard protection control, the control has the highest running performance and the lowest hard protection performance.

In S10, the hardware protection control unit 84 determines whether the present driving mode of the vehicle 100 is the autonomous driving mode or the manual driving mode. When the driving mode is the manual driving mode, the process proceeds to S30, and the hardware protection control unit 84 executes the hard protection prioritization control.

When the present driving mode is the automated driving mode, the process proceeds to S20, and the hardware protection control unit 84 determines whether the unmanned automated driving mode or the manned automated driving mode is performed. As described above, the unmanned autonomous driving mode is autonomous driving of levels 3 to 5, and the manned autonomous driving mode is autonomous driving of levels 1 to 2. When the vehicle is in the manned autonomous driving mode, the process proceeds to S40, and the hardware protection control unit 84 executes the hard protection/traveling performance compatibility control.

If the present driving mode is the unmanned autonomous driving mode, the process proceeds to S50, and the hardware protection control unit 84 executes the traveling performance prioritization control.

As described above, in the present embodiment, three types of hard protection control can be used: hard protection priority control, hard protection/traveling performance compatibility control, and traveling performance priority control. Further, when the driving mode is the manual driving mode, the hard protection control is executed which has a higher protection performance of the in-vehicle component than when the in-vehicle driving mode. Note that the hard protection/running performance compatibility control and the running performance priority control correspond to the "first hard protection control" of the present disclosure, and the hard protection priority control corresponds to the "second hard protection control" of the present disclosure.

In the hard protection control, for example, at least one of the following may be used as a method for enhancing the hard protection performance.

M1: Lowering the first threshold T1 of the component-related parameter Tp.

When the method M1 is used, the first threshold T1 is set to the lowest value in the hard protection priority control, is set to the highest value in the travel performance priority control, and is set to the intermediate value thereof in the hard protection/travel performance compatibility control.

Methods M2: The delay time Δt is shortened.

When the method M2 is used, the delay time Δt is set to the longest value in the hard protection priority control, is set to the shortest value in the travel performance priority control, and is set to the intermediate value in the hard protection/travel performance compatibility control.

Methods M3: Lower the Protective Enhancement Limit Lim2.

When using the method M3, the protection enhancement limit value Lim2 is set to the lowest value in the hard protection priority control, the highest value in the travel performance priority control, and the intermediate value thereof in the hard protection/travel performance compatibility control.

Note that two or more of M3 may be used from the method M1, or other methods may be used.

As described above, in the present embodiment, in the case where the driving mode is the manual driving mode, the hard protection control with higher protection performance of the in-vehicle component than in the automatic driving mode is executed. This is because, in the manual driving mode, the driving environment and the driver operation are unknown, and therefore, it is necessary to execute the hard protection control under the assumption of the worst situation, and it is desirable to execute the hard protection control with high hard protection performance. On the other hand, in the autonomous driving mode, since the vehicle 100 travels in accordance with the traveling plan, since the traveling environment is almost known, there is a low possibility that a malfunction such as a failure occurs in the in-vehicle component, and it is desired to enhance the traveling performance. In particular, in the unmanned automatic driving mode, since the predictability of the traveling environment is higher, it is desired to further emphasize the traveling performance. In particular, in the unmanned automatic driving mode in which the vehicle travels on a predetermined course, there are cases where shift control is performed so as to trace the traveling of a professional driver, and there is a strong tendency to emphasize the traveling performance. In such an unmanned autonomous driving mode, since the component-related parameter Tp is immediately lowered only by exceeding the first threshold T1 for an extremely short time, it is expected that a failure such as a failure occurs in the in-vehicle component is unlikely to occur.

Note that S20 of FIG. 4 may be omitted, and the same hard-protection control may be executed for the autonomous driving mode regardless of the level. Also in this case, it is preferable that the hard protection control in the manual driving mode has a higher protection performance of the in-vehicle component than the hard protection control in the automatic driving mode.

In the present embodiment, the automatic driving mode is classified into a manned automatic driving mode which is automatic driving of levels 1 to 2 and an unmanned automatic driving mode which is automatic driving of levels 3 to 5, but the automatic driving mode may be classified into three or more. Also in this case, it is preferable that the hardware protection control unit 84 executes the hard protection control so as to increase the protection performance of the in-vehicle component when the autonomous driving level is at the first level than when the autonomous driving level is at the second level higher than the first level. In this way, it is possible to improve the protection performance of the in-vehicle component when the autonomous driving level is lower.

As described above, in the present embodiment, in the case where the driving mode is the manual driving mode, the hard protection control with higher protection performance of the in-vehicle component than in the automatic driving mode is executed. As a result, in the manual driving mode, the protection performance of the in-vehicle component can be enhanced more than in the automatic driving mode, and in the automatic driving mode, the traveling performance of the vehicle can be enhanced than in the manual driving mode.

Although the above embodiments have described a vehicle with a power transmission system including an engine, the present disclosure is also applicable to battery electric vehicle such as battery-powered battery electric vehicle (BEV).

Other forms: The present disclosure is not limited to the above-described embodiments, and can be realized in various forms without departing from the spirit thereof. For example, the present disclosure can also be realized by the following aspect. The technical features in the above-described embodiments corresponding to the technical features in the respective embodiments described below can be appropriately replaced or combined in order to solve some or all of the problems of the present disclosure or to achieve some or all of the effects of the present disclosure. In addition, if the technical features are not described as essential in the present specification, they can be deleted as appropriate.

The present disclosure can be realized in various forms other than a control device and a control method of a vehicle. For example, the present disclosure can be realized in the form of a computer program that executes control of a vehicle, a non-transitory recording medium in which a computer program is recorded, or the like.

What is claimed is:

1. A vehicle control device for a vehicle, comprising a hardware protection control unit configured to execute hardware protection control of an in-vehicle component including an engine, an electric motor, a battery, a clutch, and a transmission, wherein:

functions of the hardware protection control unit are realized by a processor executing a computer program stored in a non-volatile storage medium;

in a case where a driving mode is in an autonomous driving mode, the hardware protection control unit executes first hardware protection control in accordance with a temperature of the in-vehicle component, wherein, in the autonomous driving mode, the vehicle travels in accordance with a traveling plan and a traveling environment is known;

in a case where the driving mode is in a manual driving mode, the hardware protection control unit executes second hardware protection control having a higher protection performance for the in-vehicle component than the first hardware protection control in accordance with the temperature of the in-vehicle component, wherein, in the manual driving mode, a driving environment and a driver operation condition are unknown, and the hardware protection control with the higher protection performance than the first hardware protection control is necessary;

the hardware protection control unit is configured to determine a start timing and an end timing of the hardware protection control in accordance with the temperature of the in-vehicle component;

the temperature of the in-vehicle component includes a first threshold and a second threshold which is smaller than the first threshold; and the hardware protection control unit is configured to execute the hardware protection control after a preset delay time in a case where the temperature of the in-vehicle component becomes equal to or larger than the first threshold.

2. A vehicle control device for a vehicle, comprising a hardware protection control unit configured to execute hardware protection control of an in-vehicle component including an engine, an electric motor, a battery, a clutch, and a transmission, wherein:

functions of the hardware protection control unit are realized by a processor executing a computer program stored in a non-volatile storage medium;

in a case where a driving mode is in an autonomous driving mode, the hardware protection control unit executes first hardware protection control in accordance with a temperature of the in-vehicle component, wherein, in the autonomous driving mode, the vehicle travels in accordance with a traveling plan and a traveling environment is known;

in a case where the driving mode is in a manual driving mode, the hardware protection control unit executes second hardware protection control having a higher protection performance for the in-vehicle component than the first hardware protection control in accordance with the temperature of the in-vehicle component, wherein, in the manual driving mode, a driving environment and a driver operation condition are unknown, and the hardware protection control with the higher protection performance than the first hardware protection control is necessary;

the hardware protection control unit is configured to determine a start timing and an end timing of the hardware protection control in accordance with the temperature of the in-vehicle component;

the temperature of the in-vehicle component includes a first threshold and a second threshold which is smaller than the first threshold; and the hardware protection control unit is configured to enhance protection performance by lowering the first threshold.

3. The vehicle control device according to claim 1, wherein the hardware protection control unit is configured to enhance protection performance by shortening the preset delay time.

* * * * *